United States Patent [19]
Bessette

[11] 3,868,862
[45] Mar. 4, 1975

[54] EXPANSIBLE PULLEY WITH SPEED AND TORQUE RESPONSIVE MEANS

[76] Inventor: Georges Henri Bessette, 209 Boulevard des Seminaires, St. Jean, Comte Iberville, Quebec, Canada

[22] Filed: May 14, 1973

[21] Appl. No.: 360,341

[52] U.S. Cl. ................ 74/230.17 E, 74/220.17 M
[51] Int. Cl. .......................................... F16h 55/52
[58] Field of Search ............ 74/230.17 M, 230.17 E

[56] References Cited
UNITED STATES PATENTS

| | | | |
|---|---|---|---|
| 3,230,787 | 1/1966 | Siegal | 74/230.17 E |
| 3,266,330 | 8/1966 | Galleher | 74/230.17 E |
| 3,653,283 | 4/1972 | Betz | 74/230.17 M |
| 3,661,022 | 5/1972 | Bergeron et al. | 74/230.17 E |
| 3,665,781 | 5/1972 | Kawamura | 74/230.17 E |
| 3,759,111 | 9/1973 | Hoff | 74/230.17 E |
| 3,771,378 | 11/1973 | Knobel | 74/230.17 E |

Primary Examiner—Samuel Scott
Assistant Examiner—Allan R. Burke
Attorney, Agent, or Firm—Bacon & Thomas

[57] ABSTRACT

A V-belt pulley for a variable speed transmission which may be either the driving or the driven pulley, has the connection between the movable plate of the pulley and a drive member secured to the input or output shaft effected by means of a pivotally connected link which serves to increase or decrease the pulley pressure on the belt as required under various conditions and responds to the input torque and the torque resistance at the output, possibly cooperating with the regulating effect given by centrifugal members and springs acting on the movable pulley. When used in connection with centrifugal members at the input end of the transmission, the arrangement has the advantage of avoiding the machining required in keying the movable pulley to the shaft as well as the resulting rigidity of operation. Alternatively, the arrangement avoids the danger of jamming where the centrifugal members themselves are connected in driving relationship with the movable pulley plate.

19 Claims, 11 Drawing Figures

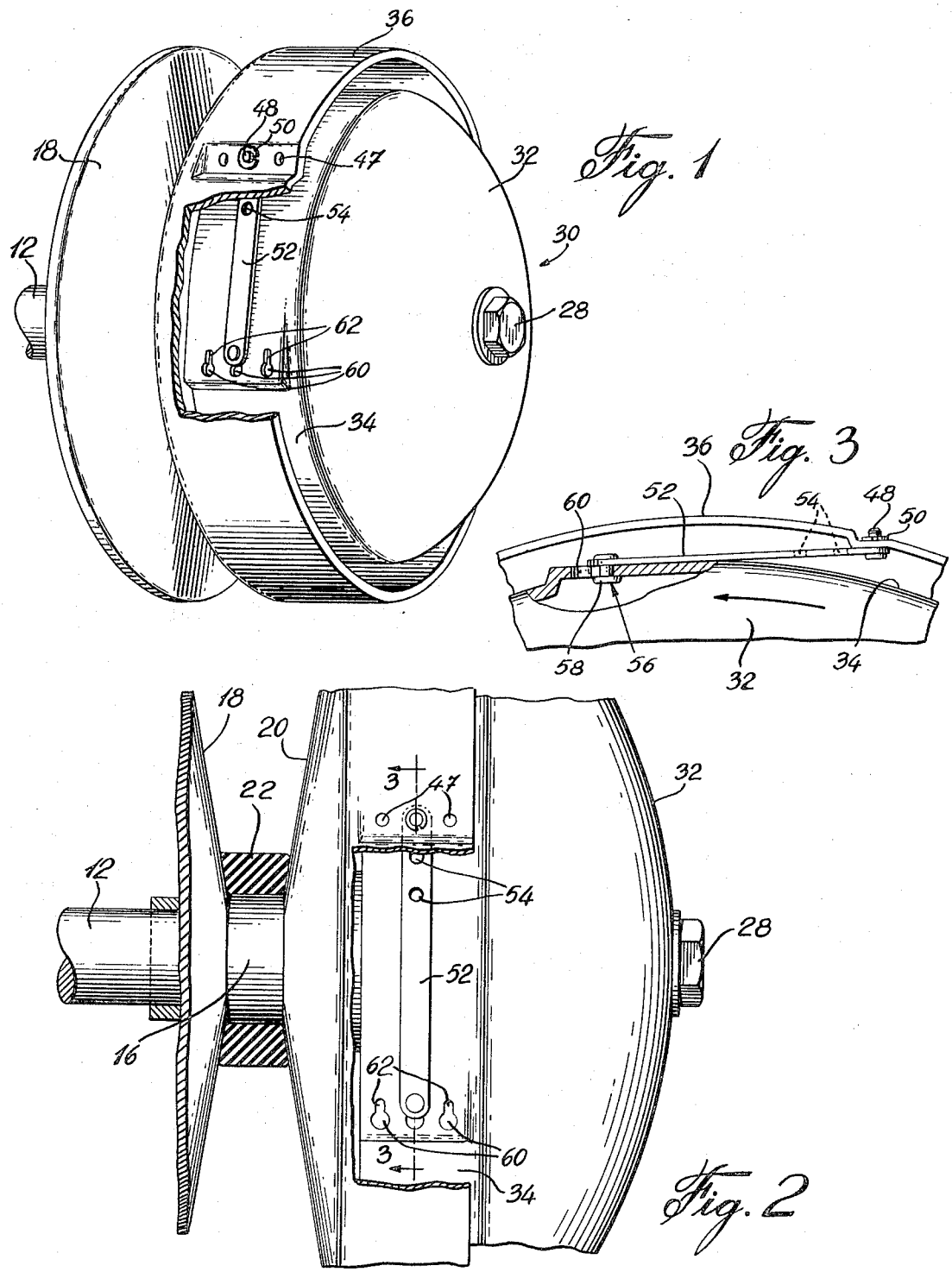

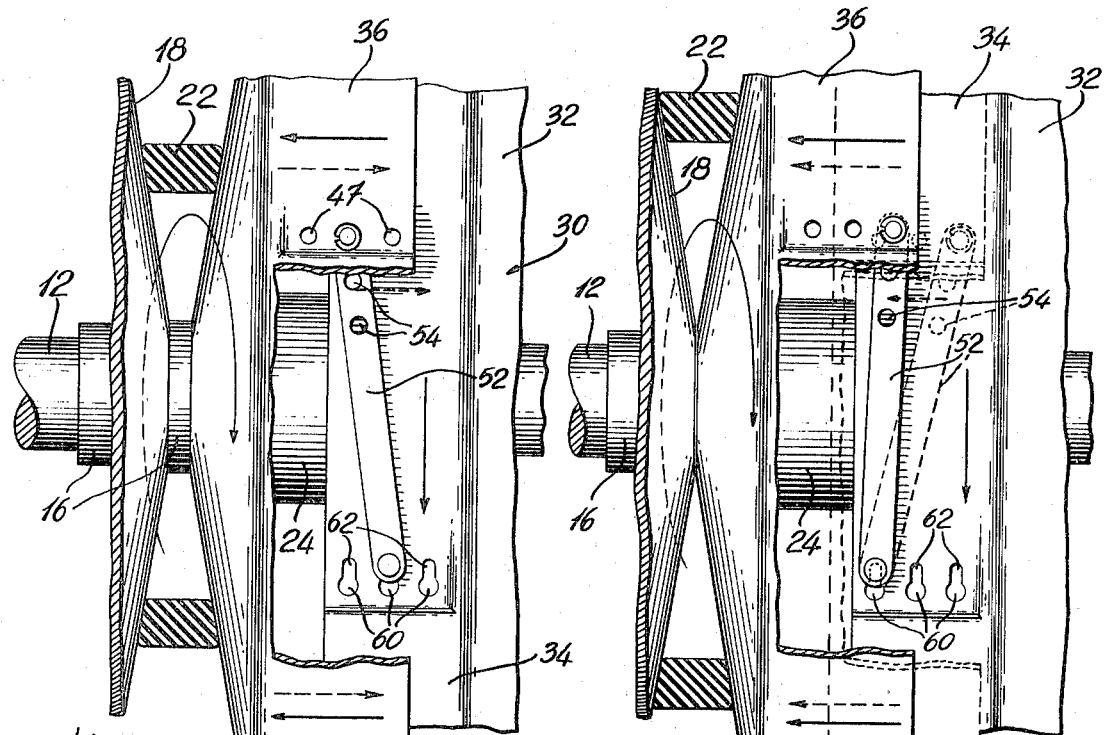
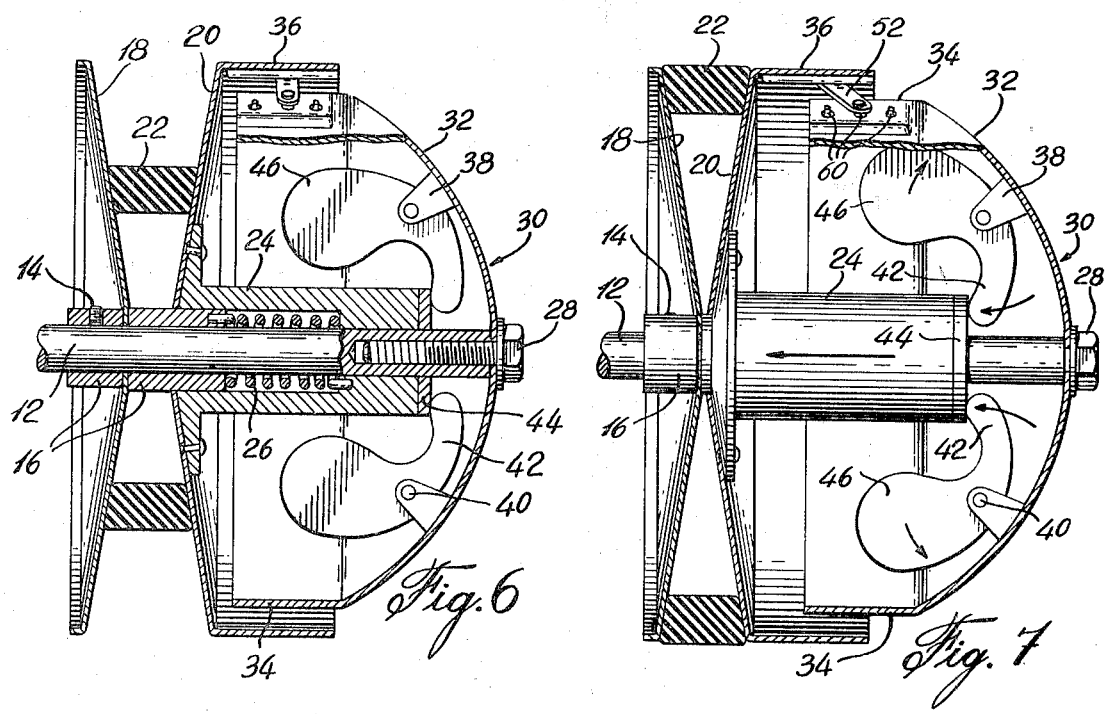

EXPANSIBLE PULLEY WITH SPEED AND TORQUE RESPONSIVE MEANS

The present invention relates to V-belt pulleys comprising separable plated such as are used in variable speed V-belt power transmissions, commonly employed in snowmobiles and other light weight vehicles as well as for a variety of other applications. In its broad aspects, the invention is applicable either to the driving pulley connected to the engine or to the driven pulley connected to the traction elements of the vehicle, such as the wheels or a rubber tread.

Variable transmissions of this type are well known. They comprise two pulleys each having separable plates and a belt trained over the pulleys. The pulleys are arranged to expand and retract in a complementary fashion to vary the speed ratio between the input and output shafts and inversely vary the torque transmitted.

Usually, one of the plates of each pulley is fixed to the shaft and the other plate is slidable on the shaft although in some cases both plates may be slidable. The movable plate is preferably also driven by the shaft so as to avoid slip which would result if the movable plate were driven by the belt only. In some cases therefore, the movable plate has been keyed or otherwise rotatively secured to the drive shaft while being axially slidable thereon. This arrangement has the drawback of requiring precise and expensive machining of the parts.

Adjustment of the spacing between the pulley plates at the input end, is commonly performed by centrifugal weights connected to the drive shaft and constituting essentially a governor which tends with increase of the drive shaft speed to bring the plates together against the action of a spring. In some cases, the operating arms of the centrifugal members penetrate grooves of a sleeve on which the movable plate is mounted so as to drive the movable plate. At high speed rates, these arms may jam in the grooves making the pulley unresponsive to decreases in the drive shaft speed which may produce strain on the engine and cause stalling thereof.

In the above-described arrangements, furthermore, the pressure tending to bring the plates together increases linearly with the speed of the drive shaft whereas it would be advantageous to vary the pressure gradient to provide greater pressure, for example at low shaft speeds where the torque resistance is greater so as to prevent slip. It might also be of advantage to vary the pressure gradient to provide less pressure at high speeds where the torque is least so as to decrease wear on the belt.

It may also be of advantage to vary these pressure gradients according to the conditions in which the vehicle or other machine is used. Thus, for example, if the the vehicle is mostly used under difficult conditions such as hill country or deep snow in the case of a snowmobile, it would be desirable to provide increased plate pressure to avoid slip while under easy conditions in flat country or on ice, less pressure would be desirable to decrease the wear on the belt.

In order to automatically take up any slack in the belt, the pulley at the output end has been provided in the prior art with a cam arrangement such that the rotation of the movable pulley with respect to the drive shaft acts through the cams tending to force the movable plate towards the fixed plate so as to take up the belt slack. The interaction of the cams gives rise to objectionable friction. Furthermore, the action of the cams is such that the pressure tending to bring the plates together is the same in any axial position of the movable pulley plate and only depends on the speed of rotation of the output shaft. Here again, it would be of advantage to provide a variable pressure gradient and to enable the pressure gradient to be adjusted as mentioned above.

It is an object of the present invention to overcome the aforementioned drawbacks and to provide the above discussed operating features which are absent from the prior art.

The invention accordingly provides a V-belt pulley comprising separable plates and means to apply a force tending to bring the plates together which force is variable with the relative axial position of the plates. More specifically, the force applying means includes means to apply a force tending to bring the plates together and means to apply an additional force adding to or subtracting from the first mentioned force. Further according to the invention, the pulley plates are rotatable about a common axis and movable both angularly and axially with respect to each other and the pulley further comprises a drive member and connecting means separately connecting the drive member for rotation with each of the plates, the means connecting the drive member to at least one of the plates including at least one link having connections to the drive member and to the one plate spaced in cranking relationship from the common axis and structured to allow a line joining the connections to take up angles variable at least with respect to planes perpendicular to the common axis, the connecting means of the drive member to the other of the plates including axially reactive means to resist axial forces exerted by the connecting means on the one plate, the force applying means broadly mentioned above including the drive member and the link. By taking up the variable angles according to the axial position of the movable plate, the link is enabled to exert a force component which depending on the direction of the angle, either adds to or subtracts from the force applied by other regulating means.

In principle furthermore, the link arrangement would be sufficient onto itself in some cases to provide regulation of the pressure to bring the plates together in the absence of other means and to vary the pressure with reference to the relative axial position of the plates.

The invention as broadly stated is applicable even to an arrangement in which both plates are axially movable in which case the axially reactive means for the other plate would be constituted by a symmetrical arrangement, but preferably according to the invention, the other plate is rotatively and axially fixed with respect to the drive member while the one plate is rotatively and axially movable with respect to the drive member.

The connections of the link and drive member to the movable plate may, according to the invention, be constructed in any fashion which allows the above stated variable angles but preferably in accordance with the invention, such connections are pivotal connections which, more specifically according to one feature of the invention, have their pivotal axes disposed in planes perpendicular to the common axis and are adjustable in axial direction with respect to the drive member or the movable plate to enable the characteristics of the pressure gradient to be modified according to requirements.

According to another feature of the invention, at least one of the pivotal connections is adjustable in radial direction with respect to the movable plate; in this case, both pivotal connections are universal joints having one pivotal axis disposed in a plane perpendicular to the aforementioned common axis and a second pivotal axis perpendicular to the above mentioned pivotal axis. This arrangement likewise enables the pressure gradient to be adjusted. Both of these alternative arrangements are capable of responding to the torque resistance if applied at the output or driven pulley to exert a regulating influence on the positioning of the belt and to take up automatically any slack in the belt, thereby fulfilling the same function as the cam arrangements in the prior art.

Further according to the invention, one or both of the pivotal connections may be adjustable along the link to vary the leverage thereof and accordingly modify the force applied thereby.

The invention as stated hereinbefore is applicable both to the driving or input pulley and to the driven or output pulley. It is thus within the scope of the invention to have the fixed plate secured to an input shaft, the drive member secured to the same input shaft and the movable pulley plate slidably and rotatably mounted on the input shaft, preferably between the fixed plate and the drive member in which case the pulley constitutes a driving or input pulley. According to further features of the invention applicable to this arrangement, a torsion spring is interposed between the movable plate and the drive member and urges the drive member in opposite angular direction from the movable plate and the link is connected to the drive member at a point thereof leading the pivotal connection of the link to the plate in the direction of rotation of the drive member so that the link is used as a tension member. Under these conditions, the pivotal connection of the link to the drive member may comprise a button engageable in a slot of a keyhole and removable through the eye thereof, the slot trailing the eye in the direction of the drive member. A number of such keyholes may be provided in axially spaced position on the drive member and the button can be selectively inserted into any of these keyholes to facilitate the aforementioned operation of varying the angle of the link. The above-mentioned torsion spring is effective to maintain tension on the link at all time to prevent the button from popping out through the eye of the keyhole.

Further according to the invention, the drive member carries centrifugal means engageable with the movable plate to urge it towards the fixed plate and the torsion spring also acts as a compression spring tending to separate the plates. In this arrangement, at least one of the keyholes is located on the drive member in an axial position on the side of the pivotal connection of the other end of the link, remote from the movable plate in at least some axial positions of the movable plate so that the link may exert a force counteracting that exerted by the centrifugal means to relieve some of the pressure of the movable plate on the belt at certain axial positions of the movable plate.

The invention also contemplates an arrangement as last described hereinabove in the absence of the torsion spring and the keyhole arrangement. Accordingly, the drive member may carry centrifugal means engageable with the movable plate to urge it towards the fixed plate and a spring may be associated with the movable plate to urge it away from the fixed plate, both pivotal connections of the link to the drive member and to the movable plate being adjustable to a position wherein a force exerted by the drive member on the plate through the link has a component tending to separate the plates. According to more specific constructional features of the invention, the movable plate has a peripheral cylindrical flange extending away from the fixed plate and the drive member has a peripheral cylindrical flange extending towards the movable plate within and closely spaced to the flange thereof and the link is pivotally connected to the flanges.

Where the pulley is used as the driven pulley, in accordance with the invention the fixed plate is secured to an output shaft, the drive member is secured to the same output shaft and the movable pulley plate is slidably and rotatably mounted on the output shaft between the fixed plate and the drive member. In this arrangement, the link is preferably connected to the movable plate at a point thereof, trailing the pivotal connection of the link to the plate in the direction of rotation of the plate. The link is thereby effective to exert a force tending to bring the movable plate towards the fixed plate to take up slack in the belt and to exert a regulating force responsive to the torque resistance of the output shaft. In this arrangement, the link is stressed in compression and preferably a plurality of such links is connected to the movable plate at points evenly distributed thereon so as to balance the forces exerted on the movable plate.

Further according to the invention, a spring is associated with the movable plate to urge it towards the fixed plate and reinforce the effect of the links.

Preferred embodiments of the invention are illustrated by way of example in the accompanying drawings in which FIG. 1 is a perspective view partly cut away of an input V-belt pulley;

FIGS. 2, 4 and 5 are fragmentary elevations partly in section of the pulley showing various positions of the same;

FIG. 3 is a fragmentary section along line 3—3 of FIG. 2;

FIGS. 6 and 7 are axial sections of the pulley in two different positions;

Figure 8:
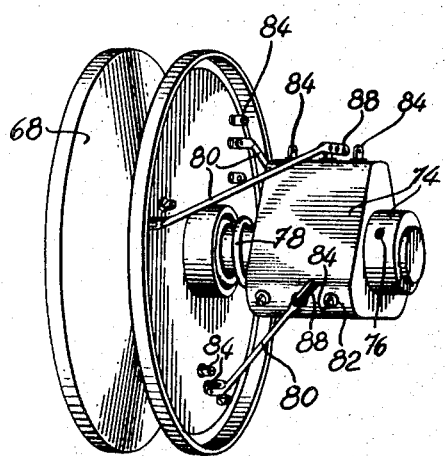
FIG. 8 is a perspective view of an output V-belt pulley according to the invention.
Figure 9:
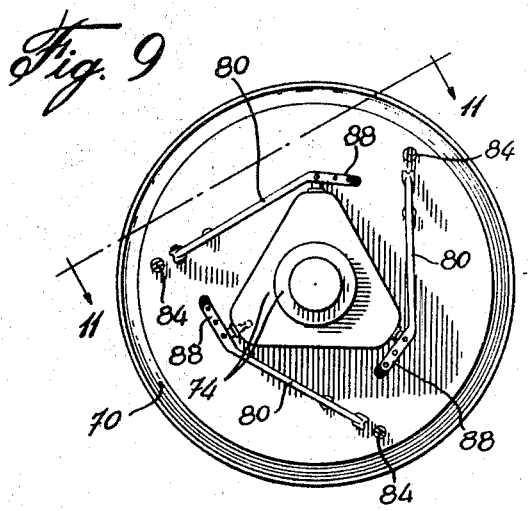
FIGS. 9 and 10 are end elevations showing two positions of the pulley.

Referring to FIGS. 1 to 7, a drive shaft 12 which may be connected to an engine (not shown) carries rigidly secured thereon by means of a set screw 14, a bushing 16 to which is firmly attached a fixed pulley plate 18. A movable pulley plate 20 is mounted facing fixed plate 18 and forms therewith a pulley for a V-belt 22.

Pulley plate 20 is secured to a sleeve 24 having a large hole slidably mounted on bushing 16 and towards its end remote from the plate 20 a smaller hole slidably mounted on the drive shaft 12. Pulley plate 20 is thus both rotatable and axially slidable with respect to drive shaft 12 and fixed plate 18.

A coil spring 26 is mounted inside the sleeve 24 around the drive shaft 12. Coil spring 26 acts as a compression spring to urge the sleeve 24 and plate 20 away from the fixed plate 18. The ends of the spring 26 are inserted in axial holes in the bushing 16 and sleeve 24 and the coil spring 26 also acts as a torsion spring to urge the sleeve 24 and movable plate 20 in opposite angular direction from the drive shaft 12 and parts associated therewith.

The end of drive shaft 12 remote from the fixed plate 18 has secured thereon by means of a screw 28, a bowl-shaped drive member 30 having a dome portion 32 and a flange portion 34 directed towards the movable plate 20 and disposed inside of and closely spaced from a cylindrical flange 36 peripherally provided on the movable plate 20 and extending in a direction away from the fixed plate 18.

The dome portion 32 of drive member 30 has secured to the interior thereof brackets 38 on which are pivotally mounted at 40 centrifugal members having arm portions 42 engageable with a striking plate 44 mounted on the end of sleeve 24 and on the other side of the pivot point 40, weights 46 which are free to move outwardly in the interior of the drive member 30.

Flange 36 of movable plate 20 is provided with an axially disposed series of holes 47, (3 in the illustrated embodiment), to anyone of which may be pivotally secured by a bolt 48 with a lock ring 50 thereon, one end of link 52. The link 52 has a number of holes 54 disposed longitudinally thereon and the bolt 48 may be connected to anyone of these holes to shorten or lengthen the effective portion of the link 52.

The other end of link 52 is provided with a button 56 securely mounted thereon. The button 56 comprises a head portion 58 capable of passing through the eye 60 of a keyhole but retained by a slot portion 62 of the keyhole. A number of such keyholes 60–62 is provided disposed axially on the cylindrical flange 34 of drive member 30.

Link 52 is connected so that the keyhole connection to drive member 30 leads the bolt connection to the movable plate 20 in the direction of rotation as indicated by arrows in FIGS. 4 and 5. The eye 60 similarly leads the slot 62.

Referring to FIGS. 8 to 11, an output shaft 64 which may be connected to the traction members of a vehicle such as wheels or the tread of a snowmobile, carries securely mounted thereon by means of a set screw 66, a bushing 67 to which is rigidly attached a fixed plate 68.

A movable plate 70 is rotatably and slidably mounted on shaft 64 by means of a sleeve 72.

The end of drive shaft 64 remote from fixed plate 68 carries rigidly thereon a triangular drive member 74 connected to the shaft by a set screw 76. A coil spring 78 is mounted on shaft 64 between sleeve 72 and drive member 74, partly penetrating the drive member. Spring 78 acts as a compression spring to urge the movable plate 70 towards the fixed plate 68. The ends of the spring 78 are inserted in axial holes in sleeve 72 and drive member 74 and the spring 78 also acts as a torsion spring tending to advance the movable plate 70 with respect to the drive member 74 in the direction of rotation as indicated by an arrow in FIG. 10.

Three links 80 are connected between the outer face of movable plate 70 and the corners of the triangular drive member 74. The connections comprise universal joints consisting of plugs 82 rotatably mounted on their own axis and tongues 84 projecting from plugs 82 and inserted between and pivotally connected to brackets 86, 88 at the ends of the links 80 connected to the movable plate and to the drive member respectively.

The movable plate 70 carries three universal joints plugs 82, 84 for each link 80, spaced in radial direction on the movable plate 70. The three sets of three plugs each are evenly distributed circumferentially on the movable plate 70. The drive member 74 carries along each corner thereof three universal joint plugs 82, 84 disposed in an axial direction.

The brackets 88 at the drive member end of each link 80 are elongated to provide three longitudinally spaced pivotal connections for the tongues 84.

The directions of the axes of the pivotal connections of the links 52 and 80 are as follows: the axes of the connections at bolt 48, button 56 and plugs 82 connected to drive member 74 are in planes perpendicular to the respective drive shaft 12 and 64. The axes of plugs 82 connected to the movable plate 70 are parallel to the axis of shaft 64. The axes of tongue connections 84 are in each case perpendicular to the axes of the respective plugs 82.

Referring to FIG. 3, the cylindrical flange 36 at the location of holes 47 and the cylindrical flange 34 at the location of keyholes 60, 62 are bent slightly inwardly and outwardly respectively as also shown in FIG. 1 so that these portions of the flanges lie in parallel planes.

Figure 10:
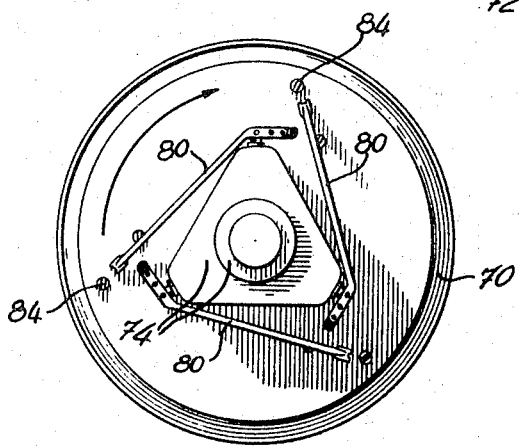
Figure 11:
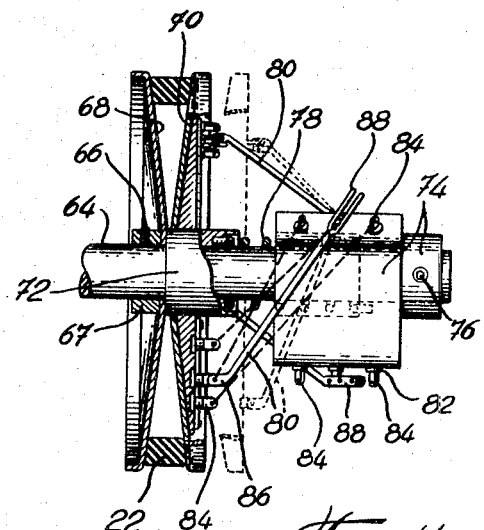
FIG. 11 is a side elevation partly in axial section of the output pulley, seen along line 11—11 of FIG. 9.

The connections of links 80 to the movable plate 70 trail the corresponding connections to the drive member 74 in the direction of rotation as indicated by the arrow in FIG. 10.

OPERATION

With the engine in idling condition, the shaft 12 rotates slowly and centrifugal members 42, 46 are in their most inward position and spring 26 urges sleeve 24 and movable plate 20 to its position furthest removed from the fixed plate 18 as shown in FIG. 2. In this position, the belt 22 lies loosely against the bushing 16 and no pressure is exerted on the belt 22 so that the transmission is in neutral position.

Engine acceleration causes an increase of speed of the drive shaft 12 and drive member 30 pushing the weights 46 gradually outwardly as shown in FIGS. 6 and 7 so that the arms 42 counteract spring 26 and push movable plate 20 towards fixed plate 18 thereby gradually forcing the belt 22 outwardly towards the periphery of the pulley plates 18 and 20. Belt 22 is trained over the output pulley 68, 70 and as it moves out on input pulley 18, 20, it moves in on output pulley 68, 70 forcing plates 68 and 70 apart against the action of spring 78 to a complementary extent thereby increasing the ratio of the transmission.

The movable plate 20 is entrained in rotation by the drive member 30 through link 52.

It will be seen that when the link 52 is disposed at an angle in which the leading end of the link leans away from the movable plate 20 as shown in FIG. 4, the pull of the drive member 30 on the link 52 causes the link 52 to exert a force tending to separate the plates 18 and 20 and thus to relieve the pressure on the belt exerted by the centrifugal members 42, 46. On the contrary, when the link 52 has its leading end leaning towards the movable plate 20 as shown in FIG. 5, particularly in the dotted line representation of the link in that figure, the pull of the drive member 30 on the link produces a force on the movable pulley 20 in the same direction as the force produced by the centrifugal members 46, 42 and which thus tends to reinforce the pressure on the belt 22. When the link 52 is in a central position, namely in a plane perpendicular to shaft 12, all the force communicated therethrough by drive member 30 is exerted in rotating the movable plate 20 and no axial component is exerted to increase or decrease the pressure exerted by the centrifugal members 46, 42.

The link 52 may be connected to anyone of holes 47 while its other end may be connected to anyone of keyholes 60, 62. When the link 52 is connected to central hole 47 and central keyhole 60, 62 as shown in FIGS. 1, 2 and 4, the straight position of link 52 corresponds to the position of maximum separation of plates 18 and 20 as shown in FIG. 2. As the plates 18 and 20 move together, the link takes up increasingly greater angular position and it increasingly relieves the pressure on the belt. Thus, the greatest pressure on the belt is exerted at low ratios while at the higher ratios, the pressure on the belt is relieved more and more. This corresponds to normal requirements in which the resistance is higher at starting and low speeds and a greater pressure on the belt is useful at those times, while the resistance decreases progressively at higher speeds and less pressure on the belt is advantageous to reduce wear and friction.

If the link is disposed as shown in FIG. 5, that is connected to the outermost hole 47 and the innermost keyhole 60, 62, it will exert pressure on the belt additional to the pressure exerted by the centrifugal members 46, 42 in all positions of the movable plate 20. The additional pressure, however, will be smallest at high ratios. This particular manner of adjustment may be used to advantage under generally difficult conditions where increased pressure on the belt is desirable throughout the operating range.

An opposite adjustment with the link connected to the innermost hole 47 and the outermost keyhole 60, 62 may be used for example for high speed travel over very smooth terrain where even less belt pressure is desired. In this case also the pressure gradient on belt 22 decreases when going from the low to the higher speed ratios.

Belt pressure may be changed by the vehicle operator on the road to suit road conditions by changing the connection of button 56 to anyone of the keyholes 60, 62. This can easily be done without the use of tools. The torsion exerted by spring 26 keeps the button 56 always positively engaged with slot 62.

At the outlet end, slack in the belt 22 is always automatically taken up by spring 78. In addition, the rotation of movable plate 70 through belt 22 exerted through links 80 onto the drive member 74 and output shaft 64 has the effect of bringing plates 68 and 70 together and increase the pressure on belt 22. Pressure on belt 22 is greater at lower speed ratios when the angle of links 80 to a plane perpendicular to the shaft 64 is more pronounced. As this angle decreases to the position shown in dotted lines in FIG. 11, the force exerted by links 80 axially on movable plate 70 to force it against fixed plate 68, is progressively decreased. The force is also proportional to the torque resistance of drive member 74 and output shaft 64 and at low speed ratios a feedback effect results which prevents shifting to the higher ratios as long as a high torque resistance is present on output shaft 64.

Links 80 may be connected selectively to any of the universal joints 82, 84 disposed axially on the drive member 74 and to any of the universal joints 82, 84 located on the movable plate 70 to adjust the belt pressure and the feedback effect according to conditions. Thus, under difficult conditions, it will be preferable to exert a higher pressure on the belt 22 and the connection of links 80 should therefore be closer to the center of the movable plate 70 and further removed from plate 70 in axial direction on the drive member 74. Also the link should be shortened by connecting it to the inmost pivotal connection on brackets 88. Adjustment in the opposite direction, namely radially outward and axially inward, may be used to relieve belt pressure under easy conditions.

The torsion of spring 78 tends to further increase the pressure on belt 22.

Various modifications are possible within the scope of the invention. Thus, springs 26 and 78 may be used as simple compression springs without the torsion effect. Furthermore, the springs may be eliminated altogether by placing the shafts vertical with the movable plate below the fixed plate in the arrangement of FIGS. 1 to 7 or above it in the arrangement of FIGS. 8 to 11.

The centrifugal clutching members 46, 42 may be replaced by manual or other automatic control means without affecting the usefulness of the link arrangement. A modification of the arrangement of FIGS. 8 to 11 may be used for an input pulley while a modification of the structure shown in FIGS. 1 to 7 may be used for the output pulley.

I claim:

1. A V-belt pulley comprising:
a shaft;
a pair of axially spaced pulley plates carried by said shaft and defining therebetween a V-shaped belt groove, at least one of said pulley plates being axially slidable and rotatable on said shaft;
means connecting the other of said pulley plates to said shaft for rotating therewith;
a drive member fixed to said shaft adjacent said one pulley plate; and
at least one link pivotally connected at its ends to said one pulley plate and said drive member, respectively, whereby to drivingly connect said one pulley plate and said drive member, said link extending from said drive member to said one pulley plate in a direction generally tangential to said shaft whereby it may assume different angles relative to the axis of said shaft as said one plate slides toward or from said other plate and thereby transmit variable axial components of force between said drive member and said one plate in accordance with the axial spacing between said plates.

2. A pulley according to claim 1, wherein said other plate is rotatively and axially fixed with respect to said drive member while said one plate is rotatively and axially movable with respect to said drive member.

3. A pulley according to claim 1, wherein said pivotal connections have pivotal axes disposed in planes perpendicular to said common axis.

4. A pulley according to claim 3, wherein at least one of said pivotal connections is adjustable in axial direction with respect to one of said drive member and said movable plate.

5. A pulley according to claim 3, wherein at least one of said pivotal connections is adjustable in radial direction with respect to said movable plate and
- both said pivotal connections are universal joints having one pivotal axis disposed in a plane perpendicular to said common axis and a second pivotal axis perpendicular to said one pivotal axis.

6. A pulley according to claim 3, wherein at least one of said pivotal connections is adjustable along said link.

7. A pulley according to claim 3, wherein said fixed plate is secured to an input shaft,
said drive member is secured to said input shaft and
said movable pulley plate is slidably and rotatably mounted on said input shaft between said fixed plate and said drive member.

8. A pulley according to claim 7, wherein a torsion spring is interposed between said movable plate and said drive member and urges said drive member in opposite angular direction from said movable plate.

9. A pulley according to claim 8, wherein said drive member carries centrifugal means engageable with said movable plate to urge it towards said fixed plate and said torsion spring also acts as a compression spring tending to separate said plates.

10. A pulley according to claim 9, wherein at least one of said keyholes is located on said drive member in an axial position on the side of the pivotal connection of the other end of said link remote from said movable plate in at least some axial positions of said movable plate.

11. A pulley according to claim 8, wherein said link is connected to said drive member at a point thereof leading the pivotal connection of said link to said plate in the direction of rotation of said drive member.

12. A pulley according to claim 11, wherein said pivotal connection of said link to said drive member comprises a button engageable in a slot of a keyhole and removable through the eye thereof, said slot trailing said eye in the direction of rotation of said drive member.

13. A pulley according to claim 12, wherein a plurality of keyholes are provided in axially spaced positions on said drive member, said button being selectively inserted into any of said keyholes.

14. A pulley according to claim 7, wherein said drive member carries centrifugal means engageable with said movable plate to urge it towards said fixed plate and a spring is associated with said movable plate to urge it away from said fixed plate,
said pivotal connection of said link to said drive member and to said movable plate being adjustable to a position wherein force exerted by said drive member on said movable plate through said link has a component tending to separate said plates.

15. A pulley according to claim 7, wherein said movable plate has a peripheral cylindrical flange extending away from said fixed plate,
said drive member has a peripheral cylindrical flange extending towards said movable plate within and closely spaced to said flange thereof and
said link is pivotally connected to said flanges.

16. A pulley according to claim 3, wherein said fixed plate is secured to an output shaft,
said drive member is secured to said output shaft and
said movable pulley plate is slidably and rotatably mounted on said output shaft between said fixed plate and said drive member.

17. A pulley according to claim 16, wherein said link is connected to said movable plate at a point thereof trailing the pivotal connection of said link to said drive member in the direction of rotation of said plate.

18. A pulley according to claim 17, wherein a plurality of such links is connected to said movable plate at points evenly distrubuted circumferentially thereof.

19. A pulley according to claim 17, wherein a spring is associated with said movable plate to urge it towards the fixed plate.

\* \* \* \* \*